US007481851B2

(12) United States Patent
Richards et al.

(10) Patent No.: US 7,481,851 B2
(45) **Date of Patent: *Jan. 27, 2009**

(54) ALKALINE CELL WITH IMPROVED ANODE

(75) Inventors: Thomas C. Richards, Framingham, MA (US); George Cintra, Holliston, MA (US); Andrew G. Gilicinski, Westboro, MA (US); Zhiping Jiang, Westford, MA (US); C. Robert Parent, Westwood, MA (US)

(73) Assignee: The Gillette Company, Boston, MA (US)

(*) Notice: Subject to any disclaimer, the term of this patent is extended or adjusted under 35 U.S.C. 154(b) by 939 days.

This patent is subject to a terminal disclaimer.

(21) Appl. No.: 10/967,006

(22) Filed: Oct. 15, 2004

(65) Prior Publication Data

US 2005/0106457 A1 May 19, 2005

Related U.S. Application Data

(63) Continuation-in-part of application No. 10/613,686, filed on Jul. 3, 2003, now Pat. No. 7,147,678.

(51) Int. Cl.

| | |
|---|---|
| ***H01M 4/82*** | (2006.01) |
| ***H01M 6/00*** | (2006.01) |
| ***H01M 6/04*** | (2006.01) |
| ***H01M 6/26*** | (2006.01) |

(52) U.S. Cl. .................... 29/623.1; 29/623.5; 429/206; 429/207; 429/229

(58) Field of Classification Search ................ 29/623.1, 29/623.5; 429/206, 207, 229

See application file for complete search history.

(56) References Cited

U.S. PATENT DOCUMENTS 2,993,947 A 7/1961 Leger (Continued)

FOREIGN PATENT DOCUMENTS

DE 3416728 A1 11/1985

(Continued)

OTHER PUBLICATIONS

R. Othman, A.H. Yahaya, and A.K. Arof, A Zinc-Air Cell Employing a Porous Zinc Electrode Fabricated from Zinc-Graphite Natural Bidegradable Polymer Paste, Journal of Applied Electrochemistry, vol. 32, p. 1347 (2002).

*Primary Examiner*—Patrick Ryan
*Assistant Examiner*—Julian Mercado
(74) *Attorney, Agent, or Firm*—Barry D. Josephs; Kevin C. Johnson; Leo J. White

(57) ABSTRACT

A method of forming an anode comprising zinc for an alkaline cell. The method involves mixing zinc particles with binders including preferably polyvinylalcohol, surfactant and water to form a wet paste. The wet paste is molded into the near shape of the cell's anode cavity and then heated to evaporate water. A solid porous zinc mass is formed having microscopic void spaces between the zinc particles. The solid mass can be inserted into the cell's anode cavity and aqueous alkaline electrolyte, preferably comprising potassium hydroxide, then added. The solid mass absorbs the aqueous electrolyte and expands to fill the anode cavity to form the final fresh anode. Zinc fibers may be added to increase the structural integrity of the solid mass.

22 Claims, 4 Drawing Sheets

815a
630
600
610
620
640
645
647
630
610
815b

U.S. PATENT DOCUMENTS

| | | | | |
|---|---|---|---|---|
| 3,853,625 | A * | 12/1974 | Louzos | 429/229 |
| 3,884,721 | A | 5/1975 | Tucholski | |
| 4,195,120 | A | 3/1980 | Rossler | |
| 5,401,590 | A | 3/1995 | Chalilpoyil | |
| 6,221,527 | B1 | 4/2001 | Tang | |
| 7,147,678 | B2 * | 12/2006 | Jiang et al. | 29/623.5 |
| 7,179,310 | B2 * | 2/2007 | Jiang et al. | 29/623.5 |
| 2002/0142202 | A1 * | 10/2002 | Li et al. | 429/27 |

FOREIGN PATENT DOCUMENTS

| | | | |
|---|---|---|---|
| WO | WO 93/00716 | * | 1/1993 |
| WO | WO 03/073536 | A1 | 9/2003 |

* cited by examiner

ALKALINE CELL WITH IMPROVED ANODE

CROSS REFERENCE TO RELATED APPLICATIONS

This application is a continuation in part of application Ser. No. 10/613,686, filed Jul. 3, 2003 now U.S. Pat. No. 7,147, 678 B2.

FIELD OF THE INVENTION

This invention relates to zinc anode for an alkaline cell. The invention relates to an anode prepared by preforming a solid porous mass comprising zinc particles to which aqueous alkaline electrolyte is added to form the final anode. The invention relates to adding strands of zinc fibers to the anode.

BACKGROUND OF THE INVENTION

Conventional alkaline electrochemical cells have an anode comprising zinc and a cathode comprising manganese dioxide. The cell is typically formed of a cylindrical casing, but casings having flat surfaces or disk type button cells are also possible. The casing is initially formed with an enlarged open end and opposing closed end. After the cell contents are supplied, an end cap with insulating plug is inserted into the open end. The cell is closed usually by crimping the casing edge over an edge of the insulating plug and radially compressing the casing around the insulating plug to provide a tight seal. An end cap plate in electrical contact with the anode can be attached over the plug to form the negative terminal. A portion of the cell casing at the opposing closed end forms the positive terminal.

Primary alkaline electrochemical cells typically include an anode comprising zinc anode active material, an alkaline electrolyte, a cathode comprising manganese dioxide cathode active material, and an electrolyte permeable separator film between the anode and cathode. (Anode active material is defined herein as anode material which undergoes useful electrochemical reaction upon cell discharge.) The separator may typically be of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agents, which become activated upon contact with alkaline electrolyte, serve to suspend the zinc particles in a gelled medium and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, polymeric binders, and other additives, such as titanium-containing compounds can be added to the cathode.

Zinc anodes for alkaline cells are conventionally prepared in the form of a slurry which is pumped into the cell's anode cavity. The slurry is typically prepared by forming a gelled electrolyte mixture comprising an aqueous alkaline electrolyte, preferably a gelled aqueous potassium hydroxide. Such gelled electrolyte can be formed, for example, by mixing a gelling agent such as a polyacrylic acid gelling agent with aqueous alkaline electrolyte. A zinc powder blend containing a small amount of surfactant is then typically mixed into gelled electrolyte to form an anode slurry mixture. The anode slurry mixture is conventionally pumped into the cell's anode cavity by a slurry pump. Although the slurry pump is designed to keep air from entering the slurry mixture, the pump nevertheless typically allows small amounts of air to enter the slurry as it is pumped into the cell's anode cavity. This causes small air pockets to develop within the anode mixture pumped into the cell's anode cavity. Such air pockets can be microscopic in size but more typically there are a number of such air pockets which are visible to the naked eye when the anode is examined by simple X-ray photography without magnification. Optionally some additional aqueous electrolyte may be added to adjust the electrolyte composition in the anode mixture after the slurry is pumped into the anode cavity. However, such additional electrolyte does not noticeably reduce the number of air pockets within the anode slurry. The presence of such air pockets within the anode slurry tends to reduce the overall conductivity of the anode because it reduces the level of zinc interparticle contact in the region of the air pockets.

In a commercial cell assembly line such zinc slurry tends to plug the dispensing tube, leading to down time of the assembly line. Also, the storage of large batches of the slurry tends to result in settling or precipitation of some of the zinc particles over time, which can result ultimately in a non-uniform distribution of zinc particles. The zinc particle settling or precipitation could also occur from the gelled zinc slurry already dispensed into the cells, for example, in cases where the cells are stored for long time or experience some shock or vibration. Such precipitation of the zinc particles will cause non-uniform distribution of the zinc within the anode and subsequent loss of electrical continuity. Also pumping the anode slurry into very small dimensioned, particularly, small irregular shaped anode cavities becomes difficult. In such case the slurry mixture must be prepared with more attention given to zinc particle shape and slurry flowability (consistency) which can compromise the final anode from the standpoint of overall conductivity. In small size cells, for example, miniature button cells, the anode can be prepared by dispensing a mixture of discrete zinc particles and gelling agent into cell's anode cavity and the adding aqueous alkaline electrolyte to form the gelled anode. In commercial production this becomes an inefficient and speed limited method of forming the anode for zinc/air cells. It can also lead to nonuniform dispersion of zinc particles within the gelled anode.

The manganese dioxide used in the cathode is preferably electrolytic manganese dioxide (EMD) which is made by direct electrolysis of a bath of manganese sulfate and sulfuric acid. The EMD is desirable since it has a high density and high purity. The resistivity of EMD is fairly low. An electrically conductive material is typically added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. The resistivity of graphites such as flaky natural or expanded graphites can typically be between about $3\times10^{-3}$ ohm-cm and $4\times10^{-3}$ ohm-cm.

It is desirable to eliminate the need for preparing the anode as a zinc slurry mixture. Rather, it is desired to prepare the anode in preformed solid form which can be inserted as a dry solid into the anode cavity without the need of pumping a slurry mixture into the anode cavity.

SUMMARY OF THE INVENTION

The invention is directed to a method of forming an anode comprising zinc for an alkaline cell. The method of forming the anode of the invention is suitable for preparing zinc anodes for alkaline cells, particularly primary (nonrechargeable) alkaline cells. The term "alkaline cell" as used herein is intended to include electrochemical cells capable of generating power wherein the electrolyte is an alkaline electrolyte. Such cells typically have an anode comprising particulate zinc, a cathode comprising manganese dioxide and aqueous alkaline electrolyte, preferably comprising potassium hydroxide. The term "alkaline cell" is intended to extend to and include the metal/air cell, in particular the zinc/air cell, which utilizes an alkaline electrolyte.

The method of the invention may also be used to prepare anodes comprising particulate zinc in alkaline cells having cathodes other than manganese dioxide, provided such cells employ aqueous alkaline electrolyte, for example, comprising aqueous potassium hydroxide. The method of the invention can be used in preparing zinc anodes for alkaline cells regardless of the cells overall shape. For example, the cell may be a cylindrical cell, button cell or flat cell, provided the cell employs aqueous alkaline electrolyte. The anode of the invention can be used regardless of the shape of the alkaline cell's anode cavity. For example, the anode of the invention is suitable for use in irregularly shaped anode cavity such as that disclosed in U.S. Pat. No. 6,482,543 B1.

The method of the invention can be also used in preparing zinc anodes which are suitable for use in zinc/air cells. Such cells typically employ an anode comprising particulate zinc and aqueous alkaline electrolyte, usually comprising potassium hydroxide. Such zinc/air cells are commonly employed in the form of button cells used, for example, in hearing aids. Zinc/air cells may also be in the form of elongated cylindrical cells. Zinc/air cells are depolarized with air and typically have cathodes comprising manganese dioxide. The manganese dioxide may act as a cathode catalyst or in part as active cathode material which undergoes useful electrochemical reaction during battery discharge.

An aspect of the invention is directed to preparing an aqueous wet zinc paste and molding the paste in the approximate shape of the anode cavity for an alkaline cell. This can be done conveniently by applying the wet paste into a steel, ceramic or plastic die having a cavity therein in the approximate shape of the cell's anode cavity. The paste fills the cavity under pressure and thereby assumes the cavity shape. The paste can be pressure-molded in the die cavity under ambient temperatures for a short time, typically 2-3 seconds. The paste molded in this manner forms a wet zinc mass (wet preform) which is readily removable from the die. The wet zinc mass (wet preform) has sufficient structural integrity so that it can stand alone outside of the die while retaining its molded shape. The stand alone wet preform is then heated to evaporate water, thereby resulting in a solid, dried, porous zinc mass (solid preform) which can be stored until the cell is ready for assembly.

The wet zinc mass (wet paste) is formed as follows: A mixture of zinc particles, surfactant, hydrogel binders, polyvinylalcohol binder and water is blended into a paste using an electric/mechanical blender until the paste has a homogeneous consistency. The amount of binders and water in the blend are adjusted to control the paste consistency. Alkaline electrolyte is not added to the wet paste. The wet paste is then inserted into a cavity within a steel, ceramic, or plastic die. The die cavity has the approximate shape of the cell's anode cavity, but preferably slightly smaller. The wet paste can have a consistency much like a wet cement and thus can be conveniently extruded into the die cavity. The wet paste can be pressure-molded in the die cavity for a short period, typically about 2-3 seconds under ambient temperatures, so that it becomes compacted and fully assumes the shape of the cavity. For example, the wet paste can be filled into die cavity having the approximate shape of the desired anode cavity. The outlet end of the die cavity may abut a detachable solid base. A first stroke of a plunger can be used to compact the wet paste within the die cavity to form the compacted wet zinc mass (wet premold). The die base can be removed and a second stroke of the plunger forces the wet zinc mass (wet premold) out from the die cavity. The binders in the wet zinc mass, particularly the polyvinylalcohol, helps to impart sufficient structural integrity to the wet mass so that it is dimensionally stabilized. The polyvinylalcohol functions as glue which holds the zinc particles together. The wet mass is dimensionally stabilized, that is, retains at least its general overall shape and can stand alone, outside of the die. The term "dimensionally stabilized" of course also extends to and includes a wet mass which completely retains the shape it obtained when formed in the mold when it is thereafter removed from the mold. Other methods of shaping the wet paste can be employed, for example, the wet paste can be inserted into an open die mold; pressure can be applied to the surface of wet paste in the mold to compact the wet paste therein to form the compacted wet zinc mass. The die mold could then be inverted to release the compacted mass. The wet zinc mass emanating from the die cavity or mold is preferably in the near shape of the anode cavity that it will be inserted into.

The wet paste forming the wet zinc mass (wet preform) comprises a mixture of zinc particles, surfactant, hydrogel binders, polyvinylalcohol binder and water. The surfactant is preferably a dinonyl phenol phosphate ester surfactant such as that available commercially under the tradename "RM-510" from Rhone-Poulenc. The binders comprises a) one or more hydrogel binders which can be in the form of commercially available gelling agents and b) a polyvinylalcohol binder. A preferred hydrogel binder is a crosslinked acrylic acid polymer gelling agent available commercially under the tradename "CARBOPOL C940" from B.F. Goodrich. The CARBOPOL C940 binder may be employed alone. Preferably, however, a hydrolyzed polyacrylonitrile grafted onto a starch backbone commercially available under the tradename "Waterlock A-221" from Grain Processing Co is added to form the total hydrogel binder. The polyvinylalcohol is added to provide structural integrity to the wet paste so that it may be molded.

The wet zinc mass (wet preform) removed from the die cavity may have the following composition: zinc (80 to 94 wt. %), surfactant, e.g. dinonyl phenol phosphate ester RM-510 surfactant (0.05 to 0.2 wt. %); total binders (0.5 to 3 wt. %) comprising for example, CARBOPOL C940 binder (0.5 to 3 wt. %) and WATERLOCK A-221 binder (0.05 to 0.33 wt. %) and polyvinylalcohol (0.2 to 1 wt. %); and water (3 to 18 wt. %). The polyvinylalcohol preferably has a molecular weight between about 85000 and 146000. Such polyvinylalcohol can be obtained commercially in solid form. It can conveniently be dissolved with water before adding it to the zinc particles. The wet zinc mass (wet preform) removed from the die cavity holds at least its general overall shape when placed on a flat surface. That is, it is dimensionally stabilized. Optionally, a separator material can be wrapped around the wet zinc mass (wet preform). The wet zinc mass may be dried by placing it in free standing form, with or without separator material wrapped around it, in an oven exposed to ambient air. The wet zinc mass, with or without separator thereon, is heated desirably at a temperature between about 55° C. and 120° C., for example, at a temperature of about 55° C., to evaporate at least a portion of the water therein. It will be understood that the term dry or dried as used herein shall mean that the wet zinc mass is treated by heating and the like so that at least a portion of the free water therein is removed. Preferably, essentially all of the free water within the wet zinc mass is evaporated during the heating step thereby forming a dry, solid porous zinc mass (solid preform).

The solid porous zinc mass (solid preform) has the near shape of a cell's anode cavity. If the wet zinc mass was wrapped with separator material before drying, then the resulting solid porous zinc mass will also have the separator intact around said solid porous zinc mass and typically adhering thereto. The zinc particles are held suspended in a tight network within the dry solid mass. The solid zinc mass (solid preform) may desirably have the following composition: zinc (96 to 99 wt. %); surfactant, e.g. dinonyl phenol phosphate ester RM-510 surfactant (0.06 to 0.25 wt. %); total binders (0.5 to 3 wt. %) comprising for example, CARBOPOL C940 binder (0.5 to 3 wt. %) and WATERLOCK A-221 binder (0.05 to 0.37 wt. %) and polyvinylalcohol (0.22 to 1.2 wt. %). The solid porous zinc mass (solid preform) may have a porosity between about 25 and 50 percent, typically of between about 40 and 50 percent. (The porosity is the volume of void spaces within the mass divided by the mass overall apparent volume.) The dry solid zinc mass (solid preform) is characterized by pockets of microscopic void spaces which appear between the individual zinc particles resulting in a porosity of the solid preform of between about 25 and 50 percent, typically between about 40 and 50 percent. These microscopic void spaces were formerly filled by the water which was evaporated from the wet zinc mass (wet preform). Surprisingly, the polyvinylalcohol functions as a glue to hold the zinc particles together in a solid porous zinc mass (solid preform). The polyvinylalcohol surprisingly provides sufficient structural integrity to prevent collapse of the solid porous zinc mass (solid preform) and assures that it retains its overall shape. The solid porous zinc mass is thus dimensionally stabilized, that is, retains at least its general overall shape in free standing form. The term "dimensionally stabilized" of course also extends to and includes a mass, for example, a solid porous zinc mass which completely retains its shape when standing alone. Thus, it can be kept in storage until ready for use in the cell. During cell assembly the solid preform can be inserted into the cell's anode cavity. Then, aqueous alkaline electrolyte, preferably comprising potassium hydroxide, is added. The solid preform immediately absorbs the aqueous alkaline electrolyte whereupon the mass preferably expands to the full shape of the anode cavity thus forming the final fresh anode. The polyvinylalcohol functions as a glue which binds the zinc particles together in both the wet zinc mass (wet preform) and the dry solid porous zinc mass (solid preform). The hydrogel binders serve mainly as gelling agents, that is, they absorb aqueous electrolyte solution and also cause expansion of the solid preform when the electrolyte solution is added thereto. The polyvinylalcohol is stable and chemically resistant to alkaline electrolyte.

The method of the invention of inserting a solid (or dimensionally stabilized) porous zinc mass into the anode cavity of an alkaline cell and then adding aqueous alkaline electrolyte thereto to form the anode thus eliminates the disadvantages associated with prior art methods of pumping a gelled anode slurry into the anode cavity or initially mixing discrete zinc particles, gelling agent and aqueous electrolyte within the anode cavity without first applying the solid porous zinc mass.

In another aspect while the structural integrity of the dry, solid porous zinc mass is sufficient for ordinary handling, the structural integrity of said solid, porous zinc mass (solid preform) can be improved by adding zinc fibers to the wet paste from which the solid preform is formed. The solid, porous zinc mass (solid preform) having such enhanced structural integrity reduces the chance of breakage of the solid porous zinc mass when it is necessary to insert it into irregular or narrowly shaped anode cavities. For example, the improved structural integrity of the solid preform makes it easier to insert it into small size cylindrical alkaline cell, or prismatic or flat alkaline cells of shallow thickness, (e.g. between about 2 and 6 mm thickness), for example wafer cells, or small zinc/air button cells, typically used for hearing aids. Also, the increased structural integrity of the solid porous zinc mass (solid preform) comprising zinc fibers reduces the chance of breakage during handling and manufacture.

The addition of the zinc fibers are optional, but when added, desirably comprise between about 2 and 10 percent by weight (or even greater) of the total zinc. The remainder of the zinc can be zinc particles of any shape, for example spherical, acicular of irregular shape or any combination thereof. Such remaining zinc particles may have a mean average particle desirably between about 30 and 1000 micron, desirably between about 30 and 400 micron, typically between about 100 and 400 micron. Such remaining zinc particles may be entirely non-spherical or a combination of spherical and non spherical particles. The zinc fibers, if added, are characterized by being elongated along one axis and short across the diameter. The zinc fibers can be intermixed randomly with smaller sized zinc particles so that they are uniformly distributed within the anode. Alternatively, the zinc fibers can be laid out so that they are concentrated on or at the top and bottom surfaces of the wet zinc mass (wet preform) and consequently also concentrated on or at the surfaces of the dry porous solid zinc mass (solid preform). The zinc fibers may desirably be added so that that they comprise between about 2 and 10 wt. % (and even more) of the total zinc content. Thus the zinc fibers may form part of or all of the zinc content in the anode. The inclusion of zinc fibers has been found to strongly enhance the mechanical properties and resistance to breakage of the solid porous zinc mass (solid preform), thus easing the handling of the solid preform before and during insertion into a cell's anode cavity.

The term "zinc fibers" as used herein shall mean elongated continuous strands of zinc having a length greater that 1 mm, desirably a length of at least 1.5 mm, preferably at least 2 mm. The length of the fibers are advantageously from 1.5 mm to 25 mm, desirably a length between about 2 mm and 25 mm, while the diameter is desirably from 0.01 mm to 0.5 mm. The zinc fibers are desirably between about 2 and 25 mm in length, preferably between about 5 mm and 20 mm length. The fibers may be elongated strands which may have cylindrical, elliptical, or non cylindrical, rectangular, or irregular shaped surfaces. Thus, the zinc fibers have an elongated surface and may appear as strands having a rounded smooth surface, but may also have an irregular shaped, jagged, or convoluted surface. The zinc fibers may have a diameter, thickness, or width desirably between about 0.05 mm and 0.5 mm. The width and thickness may be the same or different, and both width and thickness may desirably be in a range between about 0.05 mm and 0.5 mm.

DETAILED DESCRIPTION

Figure 1:
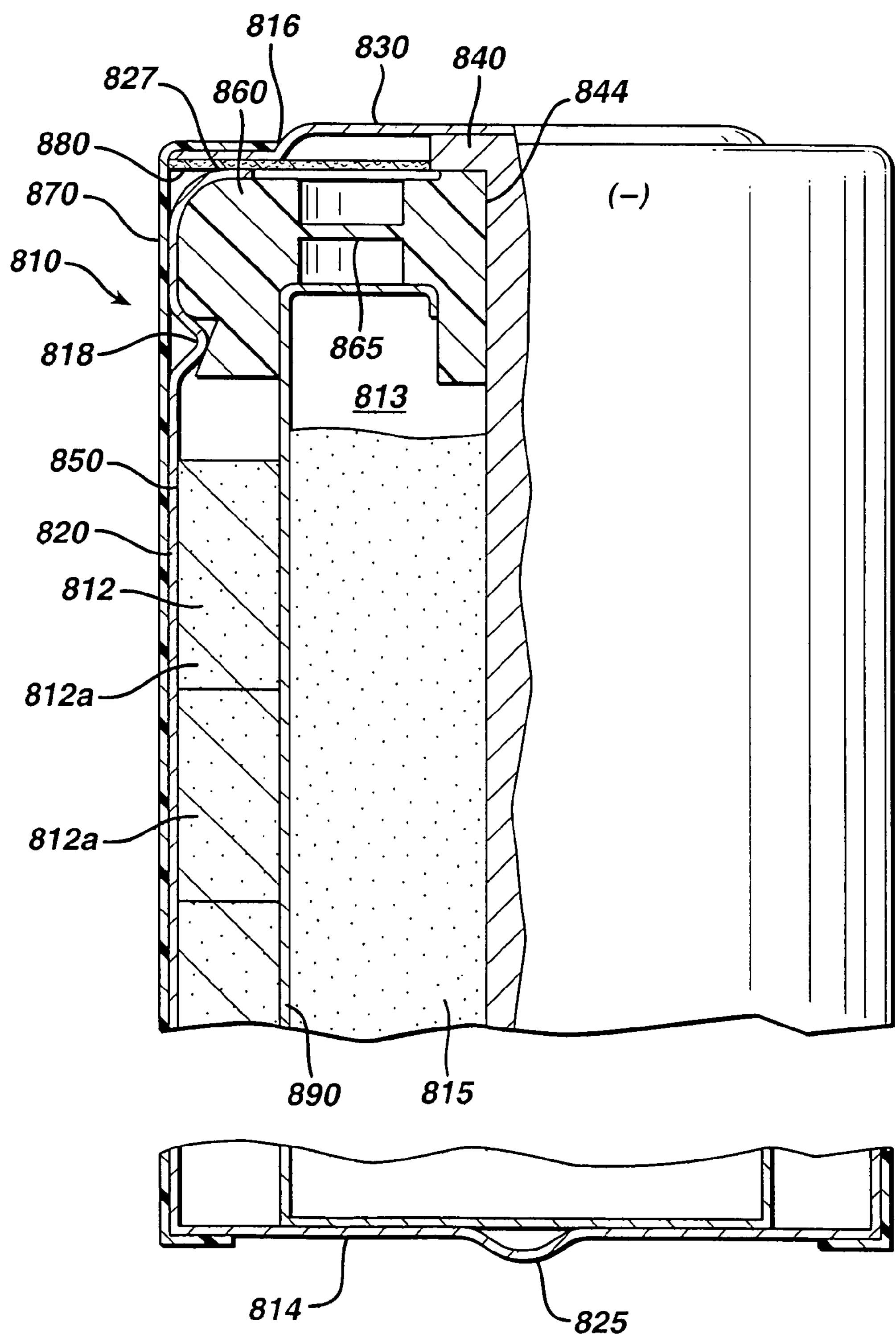
FIG. 1 is a cross-sectional cut away view of an alkaline cell having a zinc anode made by the method of the invention.

A representative alkaline cell utilizing the anode mixture of the invention is shown in FIG. 1. Alkaline cell 810 is a primary (nonrechargeable) cell. The alkaline cell 810 comprises a cylindrical casing (housing) 820 of steel, preferably nickel plated steel, having a closed end 814 and an open end 816. A premolded dry solid porous zinc mass (solid preform) 815C (FIG. 3D) is prepared and inserted into the cell's anode cavity 813 within casing 820. The solid preform is porous having a porosity, between about 25 and 50 percent, typically between about 40 and 50 percent. The solid porous zinc mass (solid preform) 815C is preferably of a hard solid consistency and is dimensionally stabilized, that is, it retains sufficient structural integrity to maintain at least its general shape outside of the cell. The solid porous zinc mass (solid preform) 815C is preferably dry and can be stored until the time of cell assembly, since the constituents therein are unreactive in a dry environment. The solid porous zinc mass 815*c* is preformed into the shape of the anode cavity but of somewhat smaller diameter so that it is readily insertable into the anode cavity. In a preferred embodiment the outside diameter of the solid preform 815C is selected to be between about 10 and 40 percent less than the inside diameter of the anode cavity 813 when initially inserted into said anode cavity. After the preformed solid zinc mass (solid preform) 815C is inserted into anode cavity 813, aqueous alkaline electrolyte, preferably comprising aqueous potassium hydroxide, is added to the anode cavity 813. The aqueous electrolyte is absorbed by the solid porous zinc mass which expands to the diameter and full shape of the anode cavity thus forming the final fresh anode 815.

Before the preformed solid porous zinc mass (solid preform) 815C is inserted into anode cavity 813, a cathode mixture 812 is prepared. The cathode mixture 812 contains a conductive material such as flaky crystalline natural graphite or flaky crystalline synthetic graphite including expanded graphites and graphitic carbon nanofiber and mixtures thereof. The cathode mixture 812 includes an aqueous KOH electrolyte solution and the mixture can be prepared wet, with aqueous KOH included before the mixture is inserted into the cell. For example, the casing (housing) 820 can be filled with the cathode mixture and the central portion of the cathode mixture can be excavated leaving the annular cathode 812 as shown in FIG. 1. The wet cathode mixture can be compacted while in the cell. Preferably, the cathode mixture 812 is compacted into a plurality of surface wet solid disks 812*a* before insertion into the cell. The cathode disks 812*a* are stacked one on top of the other and may then be additionally compacted while in the cell.

A separator sheet 890 can be placed against the inside surface of cathode disks 812*a*. Generally, separators conventionally used in zinc/$MnO_2$ alkaline cells can be used for separator 890 in the present cell 810 having the anode 815 of the invention. Separator 890 can be of cellulosic film or a film formed of nonwoven material comprising polyvinylalcohol and rayon fibers. Separator 890 can be of a single layer of such nonwoven material or can be a composite having an outer layer of cellophane adhered to the nonwoven material. The nonwoven material can typically contain between about 60 weight percent to 80 weight percent polyvinylalcohol fibers and between about 20 and 40 weight percent rayon fibers. Separator 890 can be positioned so that the cellophane layer is adjacent to either cathode 812 or anode 815. The above described separators are known and have been used in connection with conventional zinc/$MnO_2$ alkaline cell and are also suitable for use in the present alkaline cell 810. After the separator 890 is in place the solid porous zinc mass 815*c* (solid preform) of the invention can be inserted into the anode cavity 813. Alternatively, the solid porous zinc mass 815*c* can have a separator 890 wrapped around it and said solid porous mass with separator thereon, can then be inserted into the anode cavity 813. Alkaline electrolyte, preferably comprising potassium hydroxide, is then added to the anode cavity as above mentioned. The electrolyte is immediately absorbed by the solid porous zinc mass 815*c* whereupon the mass expands and forms a final fresh homogeneous anode 815 in the full shape of anode cavity 813. The final fresh anode 815 is typically of a soft, wet, spongy consistency.

After cell 810 is filled an insulating plug 860 is inserted into open end 816. Insulating plug 860 may be of polypropylene, talc filled polypropylene, sulfonated polyethylene or nylon. Plug 860 can have a thinned portion 865 therein typically of a small circular, oval or polygonal shape. Thinned portion 865 functions as a rupturable membrane which can be designed to rupture thereby releasing excessive gas within the cell. This guards against excessive buildup of gas pressure within the cell, for example, if the cell is subjected to excessive heat or abusive operating conditions. The plug 860 is preferably snap fitted around circumferential step 818 as shown in the FIG. 1 so that the plug locks in place into the open end 816. The peripheral edge 827 of casing 820 is crimped over the top of insulating plug 860. An insulating washer 880 is applied over the crimped peripheral edge 827 of casing 820. Insulating washer 880 can be a polyethylene coated paper washer. A terminal end cap 830 is welded to the head of current collector 840. An elongated current collector 840 is then inserted (force fitted) into aperture 844 of insulating plug 860 so that end cap 830 comes to rest against insulating washer 880. Current collector 840 can be selected from a variety of known electrically conductive metals found to be useful as current collector materials, for example, brass, tin plated brass, bronze, copper or indium plated brass. The current collector 840 used in the test cells was of brass. Conventional asphalt sealant may be preapplied around the current collector 840 before it is inserted into aperture 844. A film label 870 is applied around casing 820. The terminal end cap 830 becomes the negative terminal of alkaline cell 810 and pip 825 at the closed end of casing 820 becomes the positive terminal.

The cell 810 shown in FIG. 1 can be an AA cell. However, the alkaline cell shown in the figure is not intended to be restricted to any particular size. Thus, the method of the present invention is applicable to preparing anodes for AAAA, AAA, C and D size cylindrical alkaline cells as well as button shaped alkaline cells or prismatic cells or alkaline cells having an outer casing with one or more flat or curvilinear surfaces. The method of the invention is also advantageous when preparing cells of small size or thickness and having small, thin, or irregularly shaped anodes and thus may include anodes for flat alkaline cells of shallow thickness, (e.g. between about 2 and 6 mm thickness), for example wafer cells. The method of the invention can be applied to preparing zinc anodes for zinc/air cells, for example, zinc/air button cells which are commonly used for hearing aids.

Alkaline cell 810 is not intended to be restricted to any particular cathode chemistry, as long as the anode 815 is prepared by the method of the invention comprising a) forming a preformed dimensionally stabilized zinc mass, b) inserting the preformed mass into the cell's anode cavity 813, and c) adding aqueous electrolyte to the anode cavity to form a final fresh anode 815. The above cell (FIG. 1) can be an AAAA, AAA, AA, C or D cylindrical cells. These standard cell sizes are recognized in the art and are set by the American National standards Association or in Europe by the International Electrotechnical Commission (IEC). The AA cylindrical cell as referenced herein had standard overall dimensions as given by the American National Standards Institute (ANSI) battery specification ANSI C18.1M, Part 1-1999 as follows: The overall length from positive and negative terminal tips is between 49.2 mm and 50.5 mm and overall outside cell diameter is between 13.5 mm and 14.5 mm. The cell may also be in the form of flat or prismatic shaped cells.

The final fresh anode 815 preferably contains zero added mercury (less than 50 parts mercury per million parts total anode metal content (normally zinc), preferably less than 20 parts mercury per million parts total zinc in the anode). The cell 810 of the invention also preferably does not contain added amounts of lead and thus can be essentially lead free, that is, the total lead content is less than 30 ppm, desirably less than 15 ppm of zinc in the anode. The final fresh anode 815 desirably contains indium in amount between about 50 and 1000 ppm of the zinc, preferably between about 200 and 1000 ppm, desirably between about 200 and 500 ppm of the zinc.

Figure 2:
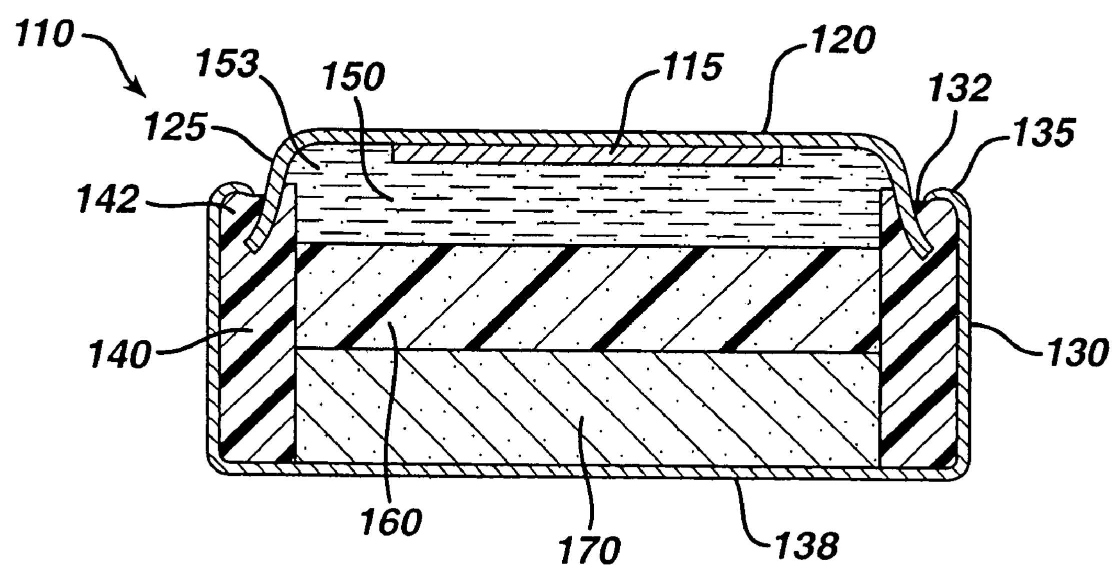
FIG. 2 is a cross sectional view of a cylindrical button cell of an alkaline cell having a zinc anode made by the method of the invention.

A zinc/manganese dioxide alkaline cell, for example, can be fabricated in the form of a cylindrical cell 810 (FIG. 1) or button or coin cell 110 as shown (FIG. 2). The cylindrical cell 810 or button cell 110 may include conventional alkaline cell cathode mixture 812 or 170, respectively, comprising manganese dioxide. Such cathode mixtures, can typically comprise for example $MnO_2$, 80 to 90 wt. %, graphite, for example, expanded graphite, between about 4 and 10 wt. %, and between about 5 and 10 wt. % of aqueous KOH electrolyte (aqueous KOH electrolyte is 30 to 40 wt. % KOH concentration, preferably between 35 and 40 wt. % KOH concentration). The aqueous KOH electrolyte preferably also contains about 2 wt. % ZnO. The cathode mixture can optionally also comprise between about 0.1 to 0.5 wt % of a polyethylene binder.

The final fresh anode composition 815 (FIG. 1) or 150 (FIG. 2) comprises: Zinc alloy powder 62 to 80 wt %, preferably between about 66 and 70 wt % (99.9 wt % zinc containing indium in total amount between about 200 and 1000 ppm zinc, typically between about 200 and 500 ppm zinc), an aqueous KOH solution comprising 38 wt % KOH and about 2 wt % ZnO; a polyvinyl alcohol binder (between about 0.15 and 1.0 wt. %, preferably between about 0.2 and 0.8 wt. %); a hydrogel binder comprising a cross-linked acrylic acid polymer gelling agent available commercially under the tradename "CARBOPOL C940" from B.F. Goodrich (e.g., 0.25 to 2 wt %) and preferably a starch graft copolymer such as a starch graft copolymer of polyacrylic acid and polyacrylamide commercially available commercially under the tradename "Waterlock A-221" from Grain Processing Co. (between 0.01 and 0.3 wt. %); dinonyl phenol phosphate ester surfactant available commercially under the tradename "RM-510" from Rhone-Poulenc (between 0.025 and 0.15%). The zinc alloy, may typically contain between about 200 and 500 parts by weight indium per million parts zinc. Such zinc alloy have mean average particle size between about 30 and 1000 micron, desirably between about 30 and 400 micron, typically between about 100 and 400 micron. It will be understood that the particle size is based on the particles' long dimension in the case of irregularly shaped particles. The zinc particles may be spherical or predominantly spherical or alternatively may be predominantly of non spherical shape, for example, polygonal or acicular shape. It shall be understood that the term zinc as used herein shall include such zinc alloy powder, since the alloy powder is composed almost entirely of zinc and functions electrochemically as zinc.

Although the above binders, namely gelling agents CARBOPOL C940 and WATER-LOCK A-221 are preferred in conjunction with the polyvinylalcohol binder to form the anode mixture of the invention, other gelling agent binders may also be used in conjunction with the polyvinylalcohol. For example, the gelling agents for the zinc slurry can be selected from a variety of known gelling agents. Preferred gelling agents are substantially insoluble in the cell electrolyte so that the gelling agent does not migrate between the anode and cathode. The preferred gelling agents also do not lose water when the final anode of the invention is left in storage. Suitable gelling agents which may be used as binders in conjunction with the polyvinylalcohol binder for the anode mixture of the invention, for example, may be carboxymethyl cellulose or crosslinked carboxymethyl cellulose, methyl cellulose, crosslinked polyacrylamides, crosslinked acrylic acid polymers such as CARBOPOL C-940 from B.F. Goodrich Co., starch graft copolymers such as WATER-LOCK A-221 starch-graft copolymer of polyacrylic acid and polyacrylamide from Grain Processing Co., and alkali hydrolyzed polyacrylonitrile such as WATER-LOCK A 400 from Grain Processing Co. Although any of these gelling agents can be employed alone or in combination, at least one of the gelling agents may advantageously be selected from crosslinked acrylic acid polymer such as CARBOPOL C940 or SIGMA POLYGEL 4P gelling agents or a starch graft copolymer such as WATER-LOCK A-221 copolymer. Additionally the polyvinylalcohol, preferably of M.W. between about 85000 and 146000 is added as described in the above to form the wet anode mixture of the invention which can be dried and converted into a dry solid porous mass (dry solid premold) of the invention which in turn can be inserted into the anode cavity of an alkaline cell. Aqueous alkaline electrolyte, preferably comprising potassium hydroxide is then added to the solid porous zinc mass whereupon the electrolyte is absorbed in the solid mass causing the mass to expand and convert into the final anode. The polyvinylalcohol binder as well as the acrylic acid polymer CARBOPOL C940 binder are chemically very stable in alkaline electrolyte and are desirable binders particularly when employed in combination for the anode of the present invention. The polyvinylalcohol in particular provides added structural integrity and holds the zinc particles together is a tight network so that a free standing solid porous mass (solid preform) may be formed.

Figure 3A:
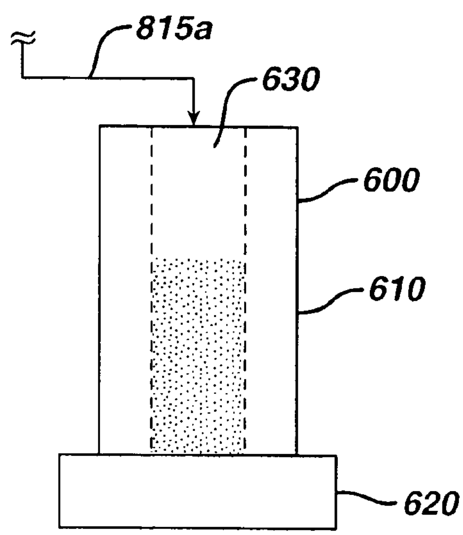
FIG. 3A is a drawing showing a die cavity being filled with a wet zinc paste of the invention.
Figure 3B:
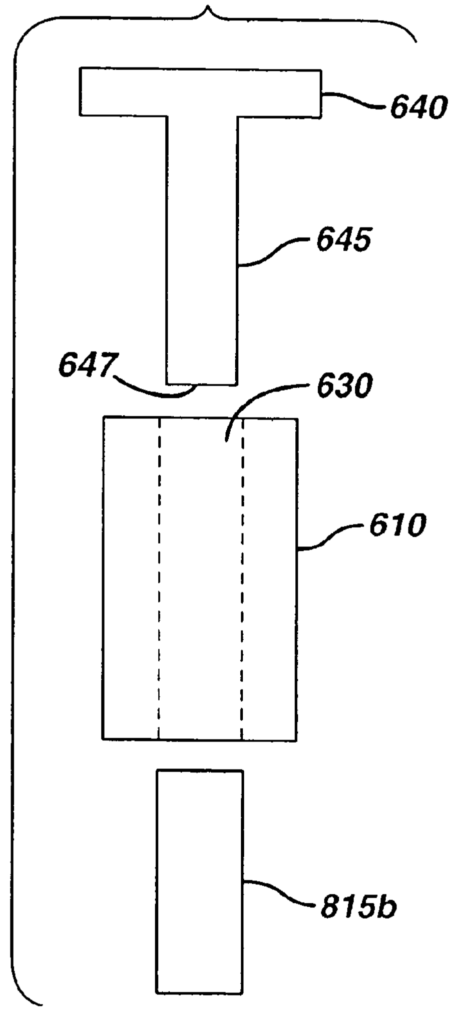
FIG. 3B is a schematic showing the wet zinc mass after it has been compacted within the die cavity.

In accordance with the invention a wet zinc paste **815*a* is first prepared and molded to form a wet preform mass 815*b* in the near shape of the anode cavity. This can be done conveniently by pouring or extruding the wet paste 815*a* into die cavity 630 of steel or plastic die 600 as shown in FIG. 3A. Die 600 has a body portion 610 with cavity 630 running therethrough. The die body sits on detachable base 620 (FIG. 3A). Die cavity 630 is in the approximate shape of the cell's anode cavity. The wet zinc paste 815***a* is molded under pressure by applying a pressure to the plunger top 640 thereby injecting plunger 645 into die cavity 630, for example, in 2-3 seconds, causing the wet zinc paste 815*a* to become compacted and molded into the cavity 630 shape. Typically, a moderate force can be applied to the plunger, desirably under about 400 pounds force, typically between about 10 and 300 pounds. Such force is applied in this manner to the exposed surface of the wet zinc paste 815*a* by a stroke of plunger 645, for die cavities 630 having diameter, for example, between about 3 and 7 mm. The amount of force is adjusted depending on the diameter or width of the die cavity 630 and the amount of the wet zinc paste present within the die. Smaller diameter cavities and smaller amount of the wet zinc paste require less plunger force than larger diameter cavities and larger amount of the wet zinc paste. Die base 620 is then detached from the die body 610. The molded wet zinc mass (wet preform) 815*b* can be pushed through the die cavity 630 by a second stroke of plunger 645 (shown in retracted position in FIG. 3B). The wet preform 815*b* (FIG. 3B) emanating from die cavity 630 (FIG. 3B) is dimensionally stable, that is, has sufficiently strong structural integrity so that it can stand alone outside of the die while retaining at least its general molded shape.

Figure 3C:
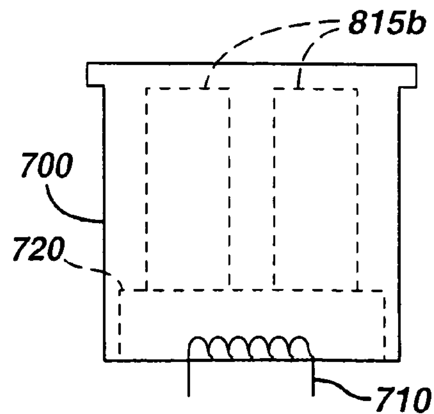
FIG. 3C is a schematic showing the compacted wet zinc mass being dried in an oven to produce a dry solid mass.
Figure 3D:
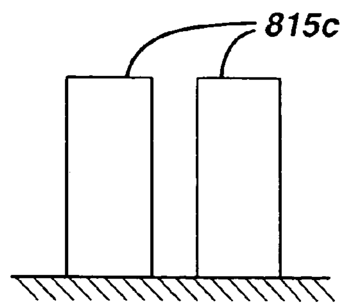
FIG. 3D is schematic showing the dry solid mass product.

Thus, the wet zinc mass 815*b* (wet preform) in a preferred embodiment can be placed on a flat tray or surface 720 which can be inserted in an oven 700 (FIG. 3C). Optionally, separator 890 can be wrapped around wet zinc mass 815*b* so that wet zinc mass 815*b* with separator 890 thereon is placed in an oven 700. In such case separator 890 can be wrapped around wet zinc mass 815*b* so that it covers at least the bottom and side surfaces of said wet mass 815*b* in a configuration shown, for example, in FIG. 1. This may be accomplished by wrapping a single sheet of separator 890 around the surfaces of wet zinc mass 815*b*. Alternatively, separator 890 may be applied in strips, for example two strips, oriented at right angles to each other and overlapping at their mid sections. Such overlapping strips can be placed under the wet zinc mass 815*b* and the strips folded up to cover at least the side and bottom surfaces of said wet zinc mass 815*b*, resulting in the configuration, for example, shown in FIG. 1. Separator 890 may be of electrolyte permeable material conventionally employed in alkaline cells. The separator 890 may adhere to the wet zinc mass 815*b*. Having the separator 890 wrapped around the wet zinc mass 815*b* avoids the need of inserting the separator 890 into the anode cavity before anode material is inserted therein.

The wet zinc mass 815*b* (wet preform), with or without separator 890 wrapped around it, is then heated in an oven 700 at elevated temperature, desirably between about 55° C. and 120° C., typically at about 55° C. in ambient air (or inert gas). Oven 700 can be a conventional oven heated by an electric or gas source 710. Such heating evaporates at least a portion of the free water therein, thereby resulting in a dried and porous zinc mass (solid preform) 815*c*. If the wet zinc mass 815*b* was wrapped with separator 890, then the solid zinc mass 815*c* will also have the separator 890 intact around said solid zinc mass 815*b* and typically adhering thereto. The dry zinc mass 815*c* (FIG. 3D) is dimensionally stable and thus can stand alone without change in at least its general shape. It can be stored in sealed containers until time for cell assembly. The zinc mass 815*c* (solid preform), with or without separator 890 wrapped around it, is then inserted into the cell's anode cavity 813 and aqueous electrolyte added thereby expanding the zinc mass to form the final fresh anode 815.

The wet zinc paste 815*a* inserted into die cavity 630 is formed as follows: A mixture of zinc particles, surfactant, hydrogel binders, polyvinylalcohol binder and water is blended into a paste using an electric/mechanical blender for a period of time, typically about 2-3 minutes, until the paste has a homogeneous consistency. The amount of binders and water in the blend are adjusted to control the paste consistency. The wet paste is then inserted into a steel, ceramic or plastic die having a die cavity 630 (FIG. 3A) in the approximate shape of the anode cavity, but preferably slightly smaller. For example, the diameter of die cavity 630 may typically be between about 10 and 40 percent smaller than the inside diameter of anode cavity 813. The wet paste assumes the shape of the die under pressure in about 2-3 seconds. The wet paste is then removed in its entirety from the die and is now in the form of a wet zinc mass (wet preform) in the near shape of the anode cavity. The binders in the wet mass, particularly the polyvinylalcohol, impart sufficient structural integrity to the mass so that the molded wet preform can stand alone outside of the die.

The wet paste forming the wet zinc mass 815*b* (wet preform) comprises a mixture of zinc particles, surfactant, hydrogel binders, polyvinylalcohol binder and water. The wet paste is formed without adding aqueous electrolyte. The surfactant is preferably a dinonyl phenol phosphate ester surfactant such as that available commercially under the tradename "RM-510" from Rhone-Poulenc. The binders comprises a) one or more hydrogel binders (gelling agents) and b) a polyvinylalcohol binder. A preferred hydrogel binder is a cross-linked acrylic acid polymer gelling agent available commercially under the tradename "CARBOPOL C940" from B.F. Goodrich. The CARBOPOL C940 binder may be employed alone. Preferably, however, a hydrolyzed polyacrylonitrile grafted onto a starch backbone commercially available commercially under the tradename "Waterlock A-221" from Grain Processing Co is added to form the total hydrogel binder. The hydrogel binders function more as binders in the wet preform, since the wet preform does not include alkaline electrolyte. (The hydrogel become gelling agents in the presence of alkaline electrolyte.)

The wet preform 815*b* may have the following composition: zinc (80 to 94 wt. %), surfactant, e.g. dinonyl phenol phosphate ester RM-510 surfactant (0.05 to 0.2 wt. %); total binders (0.5 to 3 wt. %) comprising for example, CARBOPOL C940 binder (0.5 to 3 wt. %) and WATERLOCK A-221 binder (0.05 to 0.33 wt. %) and polyvinylalcohol (0.2 to 1 wt. %); and water (3 to 18 wt. %).

Figure 4:
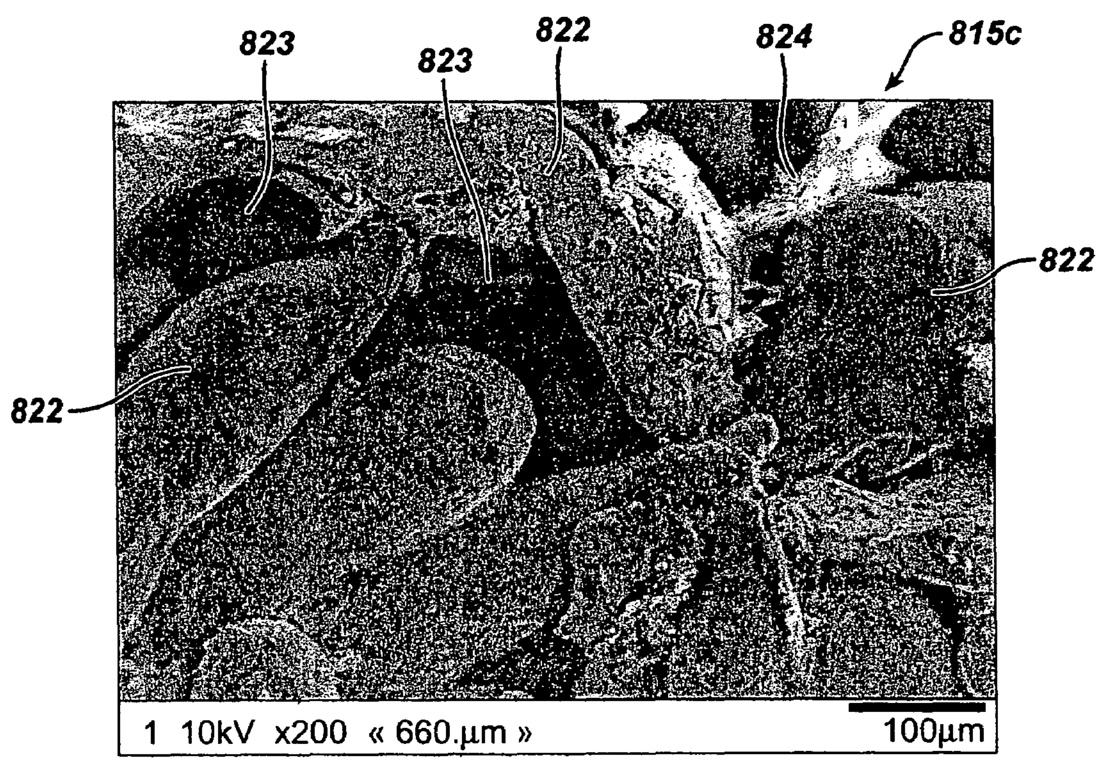
FIG. 4 is a scanning electron micrograph showing the void spaces between zinc particles after water has been evaporated to form a solid porous zinc mass (solid preform).

The wet preform 815*b* is heated in an oven at temperature desirably between about 55° C. and 120° C., preferably at about 55° C, for a period of about 2 to 3 hours or less in ambient air (or inert gas). Such heating evaporates at least a portion of the water in the wet preform thereby forming a solid, porous zinc mass (solid preform) 815C in the near shape of the anode cavity. It is desirable to keep the heating temperature below about 120° C. to avoid degradation of the polyvinylalcohol and/or gelling agents within the wet preform 815*b*. The solid preform 815C may desirably have the following composition: zinc (96 to 99 wt. %); surfactant, e.g. dinonyl phenol phosphate ester RM-510 surfactant (0.06 to 0.25 wt. %); total binders (0.5 to 3.3 wt. %) comprising for example, CARBOPOL C940 binder (0.5 to 3.3 wt. %) and WATERLOCK A-221 binder (0.05 to 0.37 wt. %) and polyvinylalcohol (0.22 to 1.2 wt. %). The mean average zinc particle size may be between about 30 and 1000 micron, typically between about 100 and 400 micron. The solid porous zinc mass (solid preform) may be stored for very long periods, essentially for many months or even years, since there is no component therein which will react with each other or with the zinc particles. The solid preform may be stored in air under ambient conditions, since exposure to air does not cause noticeable deterioration of the zinc particles or other components within the dry preform. The solid porous zinc mass (solid preform) 815C is characterized by pockets of microscopic void spaces which appear between the individual zinc particles resulting in a porosity of the solid preform of between about 25 and 50 percent, typically between about 40 and 50 percent. Such microscopic void spaces 823 between zinc particles 822 are clearly seen in the scanning electron micrograph of the solid porous zinc mass 815C shown in FIG. 4. These void spaces were formerly filled by the water which was evaporated from the mass. The binder material 824 such as polyvinylalcohol is shown in FIG. 4 between the zinc particles 822 and holds the zinc particles 822 together in a solid porous mass. Surprisingly, the polyvinylalcohol, preferably at molecular weight between about 85000 and 146000, functions as a glue to hold the zinc particles together in the solid porous zinc mass (solid preform). The polyvinylalcohol imparts structural integrity to prevent collapse of the solid preform after formation as well as during storage. The solid preform can be placed in storage for long periods, for example, many months or even years before it is desired to insert it into the cell's anode cavity.

When it is desired to load the alkaline cell with anode material, the solid porous zinc mass 815*c* (solid preform), with or without separator 890 wrapped around it, is inserted in the cell's anode cavity. Alkaline electrolyte, preferably an aqueous solution of potassium hydroxide, is then added to the anode cavity. Desirably the aqueous alkaline electrolyte comprising potassium hydroxide (concentration between about 35 and 40 wt. % KOH, 2 wt. % ZnO) is added to the anode cavity in amount so that the weight ratio of aqueous electrolyte to the solid porous zinc mass (solid preform) is between about 0.25 and 0.75. The aqueous alkaline electrolyte becomes absorbed into the solid preform causing the preform to expand and tightly fill the anode cavity. The addition of the aqueous alkaline electrolyte also activates the gelling characteristics of the hydrogel binders. The zinc particles become held together in a tighter network than in conventional zinc slurry anodes and there are no visible air pockets within the final anode when the anode is viewed in normal size by X-ray photography. The tighter network of zinc particles tends to improve conductivity and overall preformance of the anode. The polyvinylalcohol functions as a glue which binds the zinc particles together, whereas the hydrogel binders serve mainly as a gelling agents, that is, they absorb aqueous electrolyte solution and also cause expansion of the dry zinc mass when the electrolyte is added thereto.

In the button cell 110 shown in FIG. 2, a disk-shaped cylindrical housing 130 is formed having an open end 132 and a closed end 138. Housing 130 is formed from nickel-plated steel. An electrical insulating member 140, preferably a cylindrical member having a hollow core, is inserted into housing 130 so that the outside surface of insulating member 140 abuts and lines the inside surface of housing 130. Optionally, the inside surface of housing 130 can be coated with a polymeric material, or asphalt sealant and the like, that interfaces between insulator 140 and the inside surface housing 130. Insulator 140 can be formed from a variety of thermally stable insulating materials which resist attack by alkaline electrolyte, for example, nylon or polypropylene.

With reference to the button cell of FIG. 2, the cathode mixture 170 comprising $MnO_2$ (EMD), graphite, aqueous electrolyte can be prepared by simple mixing at ambient temperature in a conventional blender until a homogenous mixture is obtained. The graphite can be flaky natural crystalline graphite, flaky crystalline synthetic graphite, expanded graphite or any mixture thereof. The cathode composition may be as described above with reference to the cylindrical cell 810 (FIG. 1). The cathode 170 is applied as a layer or a pressed disk abutting the inside surface of the closed end 138 of housing 130. The separator sheet 160 is placed overlying cathode 170. The separator 160 can be a conventional ion porous separator as described above with respect to separator 890 (FIG. 1). In the specific embodiment shown in FIG. 2 the separator 160 may comprise an outer layer of cellulose or cellophane (abutting anode 150) and an inner layer of a nonwoven material composed of cellulosic (rayon) and polyvinylalcohol fibers.

The anode 150 can be prepared in accordance with the method of the invention as above described in which a wet zinc mass (wet preform) is prepared and molded into the near shape of the disk shaped anode cavity 153 (FIG. 2). The wet zinc mass (wet preform) is then dried to form a solid porous zinc mass (solid preform). The solid preform is then inserted into anode cavity over separator 160. Aqueous alkaline electrolyte is then added to the anode cavity 153 and absorbed by the solid preform to form the final fresh anode 150. The anode cover 120, formed preferably of nickel-plated steel is inserted into the open end 132 of housing 130. An anode current collector 115 comprising a sheet of brass, tin-plated brass, bronze, copper or indium-plated brass can optionally be welded to the inside surface of anode cover 120. Peripheral edge 135 of housing 130 is crimped over the exposed insulator edge 142 of insulating member 140. The peripheral edge 135 bites into insulator edge 142 closing housing 130 and tightly sealing the cell contents therein. The anode cover 120 also functions as the negative terminal of the cell and the housing 130 at the closed end 138 functions as the cell's positive terminal.

A comparative AA cylindrical cell 810 was prepared employing conventional MnO2 cathode, separator and anode made in conventional manner using a zinc slurry. A set of test AA cells were prepared with the same cathode composition, separator, but the anode was made by the method of the invention. The comparative AA cell 810 was prepared with conventional anode and cathode and separator. The anode was prepared from a conventional zinc slurry mixture which was pumped into the anode cavity 813. Test cylindrical AA cells 810 were then prepared. The cathode and separator of the test cells were the same as that used in the comparative cell. The separator 890 was a conventional ion porous separator consisting of an inner layer of a nonwoven material of cellulosic (rayon) and polyvinylalcohol fibers and an outer layer of cellophane. However, the anode 815 in the test cells was prepared in accordance with the method of the invention in which a wet zinc mass (wet preform) was molded into the near shape of the anode cavity. The wet preform was then dried to form a solid porous zinc mass (solid preform) as above described. The solid preform was inserted into anode cavity 813. Aqueous alkaline electrolyte was added to the anode cavity and absorbed by the solid preform to form the final anode. The comparative AA cell and test AA cells each had the same amount of zinc, namely, 4.6 grams. The cells were balanced so that the theoretical milliamp-hrs capacity of $MnO_2$ (based on 370 milliamp-hours per gram $MnO_2$) divided by the theoretical capacity of zinc (based on 820 milliamp-hours per gram zinc) is about 1. The preformance of the cells, service life (milliamp-hrs) and energy output (milliwatt-hrs) was determined by discharging at constant current drains of 50 milliAmp and 500 milliAmp to cut off voltage of 0.5 volts.

EXAMPLE 1

Comparative Test—Conventional Anode Slurry/Conventional MnO2 Cathode

Test cylindrical AA cells of the general configuration shown in 810 (FIG. 1) were prepared. The cathode 812 in the comparative AA cell and test AA cells, for example, may have the following representative compositions: 80-90 wt % of electrolytic manganese dioxide (e.g., Trona D from Kerr-McGee), 4-10 wt % of expanded graphite (Timcal E-BNB90, BET surface of 24.3 $m^2/g$ ), 5-10 wt % of an aqueous KOH solution having a KOH concentration of about 35-40 wt. %. A specific cathode composition for the comparative AA cell and test AA cells used for the performances tests reported in the Tables was as follows:

| | Cathode Composition[1] Wt. % |
|---|---|
| $MnO_2$ (EMD) | 87 |
| Expanded graphite (Timcal E-BNB90) | 8 |
| KOH aqueous Solution (36 wt % KOH and 2 wt % ZnO) | 5 |
| | 100 |

Notes:
[1]Conversion to volume percent can be made using the following real densities: $MnO_2$ (EMD), 4.48 g/cc;expanded graphite (Timcal E-BNB90), 2.25 g/cc; and 36 wt % KOH aqueous solution, 1.35 g/cc.

The anode of the comparative test cell 810 was prepared in conventional manner by preparing a zinc anode slurry as described above in the Background Section. Before the anode slurry was added into the anode cavity, ~1.25 g of an aqueous KOH solution comprising 38 wt % KOH and about 2 wt % ZnO was added into the cell casing to fill the pores within the $MnO_2$ cathode. Subsequently, the anode slurry was pumped into the anode cavity using a conventional slurry pump, normally employed in the service of pumping anode slurries. Although care was taken to prevent air from entering the slurry mixture there were nevertheless several visible air pockets within the final anode slurry as introduced into the anode cavity. Such air pockets were visible to the naked eye from X-ray photographs of the cell taken without magnification. The zinc slurry which filled the anode cavity 813 formed anode 815 having 4.6 grams zinc. The final anode 815 had the following composition: 70 wt % of Zinc alloy powder (99.9 wt % zinc containing indium in total amount of 500 ppm zinc, 29.4 wt % of an aqueous KOH solution comprising 38 wt % KOH and about 2 wt % ZnO; 0.44 wt % of a cross-linked acrylic acid polymer gelling agent available commercially under the trade name “CARBOPOL C940” from B.F. Goodrich and 0.032 wt % of a hydrolyzed polyacrylonitrile grafted onto a starch backbone commercially available commercially under the tradename “Waterlock A-221” from Grain Processing Co.; 0.117 wt % of dinonyl phenol phosphate ester surfactant available commercially under the tradename “RM-510” from Rhone-Poulenc. The zinc alloy mean average particle size was about 320 micron. The separator 890 was a conventional dual layered cellulosic separator employing an outer layer comprising rayon and polyvinylalcohol (facing cathode 812) and inner layer of cellophane facing anode 815.

Fresh AA cells of Example 1 were discharged at a constant rate of 50 milliAmp. In separate tests batches of fresh AA cells 810 of Example 1 were discharged at a constant rate of 500 milliAmp.

At discharge of 50 milliAmp, the capacity obtained at a cut off voltage of 0.5 Volts was 3010 milliAmp-hrs. The average voltage at 50% capacity was 1.22 Volt. The energy output of the cell at 0.5V cutoff was 3520 milliWatt-hrs.

At discharge of 500 milliAmp, the capacity obtained at a cut off voltage of 0.5 Volts was 1550 milliAmp-hrs. The average voltage at 50% capacity was 1.06 Volt. The energy output of the cell at 0.5V cutoff was 1590 milliWatt-hrs.

A cell gassing test was conducted by measuring the amount of gas generated from the zinc anode when the fresh zinc anode was placed in a sealed bag and stored at 60° C. for 4 weeks. The amount of gassing was 0.0120 ml gas per gram of anode.

EXAMPLE 2

Anode from Solid Porous Zinc Mass/ Conventional MnO2 Cathode

Test AA size cells 810 were prepared as in Example 1 except that the anode 815 was formed from the wet zinc mass (wet preform) which was molded into the approximate shape of the anode cavity 813 and then dried to produce the solid porous zinc mass (solid preform) 815C of the invention. The solid preform was inserted into the anode cavity 813 and then aqueous potassium hydroxide electrolyte (concentration between about 35 and 40 wt. % KOH and 2 wt. % ZnO) was added. The solid porous zinc mass (solid preform) immediately absorbed the alkaline electrolyte and expanded to form the final fresh wet anode as described in the description hereinabove. The cathode composition comprising $MnO_2$ was the same as used in Example 1. The cell had 4.6 grams of zinc as in Example 1 and was balanced so that the theoretical capacity of the zinc divided by the theoretical capacity of the $MnO_2$ was about 1.

The wet zinc mass (wet preform) had the following composition:

| | Wet Preform, Wt. % |
|---|---|
| Zinc | 89.20 |
| Surfactant | |
| Dinonyl phenol phosphate ester surfactant (RM-510) | 0.101 |
| Binders | |
| CARBOPOL C940 binder | 0.978 |
| WATERLOCK A-221 binder | 0.101 |
| Polyvinylalcohol (M.W. 85000 to 146000) | 0.305 |
| Water | 9.32 |
| | 100.00 |

The wet zinc mass is molded into the near shape, though somewhat smaller size of the anode cavity. The molded wet zinc mass (wet preform) is then dried by heating in an oven at about 55° C. for a period of about 2 to 3 hours to evaporate water leaving a solid porous zinc mass (solid preform) having a porosity between about 40 and 50%. The solid porous zinc mass (solid preform) has the following composition:

| | Solid Porous Zinc Mass (Solid Preform) Wt. % |
|---|---|
| Zinc | 98.4 |
| Surfactant | |
| Dinonyl phenol phosphate ester surfactant (RM-510) | 0.112 |
| Binders | |
| CARBOPOL C940 binder | 1.08 |
| WATERLOCK A-221 binder | 0.112 |
| Polyvinylalcohol | 0.336 |
| | 100.00 |

After the solid porous zinc mass (solid preform) is inserted into the anode cavity an aqueous potassium hydroxide electrolyte comprising 38 wt % KOH and about 2 wt % ZnO was added in amount approximately about 0.7 part by weight aqueous electrolyte to 1 part by weight solid preform. The solid preform immediately absorbed the aqueous electrolyte and expanded to fill the anode cavity to form the final fresh anode. The final fresh anode did not have any discernible air pockets therein when the anode was viewed with the aid of X-ray photographs of the cell taken without magnification. The polyvinylalcohol within the final fresh anode helped to hold individual zinc particles in close proximity to one another within a tight network.

Fresh AA cells of Example 2 were discharged at a constant rate of 50 milliAmp. In separate tests batches of fresh AA cells of Example 2 were discharged at a constant rate of 500 milliAmp.

At discharge of 50 milliAmp, the capacity obtained at a cut off voltage of 0.5 Volts was 2930 milliAmp-hrs. The average voltage at 50% capacity was 1.23 Volt. The energy output of the cell at 0.5V cutoff was 3450 milliWatt-hrs.

At discharge of 500 milliAmp, the capacity obtained at a cut off voltage of 0.5 Volts was 1530 milliAmp-hrs. The average voltage at 50% capacity was 1.07 Volt. The energy output of the cell at 0.5V cutoff was 1630 milliWatt-hrs.

A cell gassing test was conducted by measuring the amount of gas generated from the zinc anode when the fresh zinc anode was placed in a sealed bag and stored at 60° C. for 4 weeks. The amount of gassing was 0.0122 ml gas per gram of anode.

EXAMPLE 3

Anode from Solid Porous Zinc Mass/Conventional MnO2 Cathode

Test AA size cells 810 were prepared as in Example 1 except that the anode 815 was formed from the wet zinc mass (wet preform) which was molded into the approximate shape of the anode cavity 813 and then dried to produce the solid porous zinc mass (solid preform) 815C of the invention. The solid preform was inserted into the anode cavity 813 and then aqueous potassium hydroxide electrolyte (concentration between about 35 and 40 wt. % KOH and 2 wt. % ZnO) was added. The solid porous zinc mass (solid preform) immediately absorbed the alkaline electrolyte and expanded to form the final wet anode as described in the description hereinabove. The cathode composition comprising $MnO_2$ was the same as used in Example 1. The cell had 4.6 grams of zinc as in Example 1 and was balanced so that the theoretical capacity of the zinc divided by the theoretical capacity of the $MnO_2$ was about 1.

The wet zinc mass (wet preform) had the following composition which involved a lower zinc composition than in Example 2:

| | Wet Preform, Wt. % |
|---|---|
| Zinc | 86.65 |
| Surfactant | |
| Dinonyl phenol phosphate ester surfactant (RM-510) | 0.106 |
| Binders | |
| CARBOPOL C940 binder | 1.27 |
| WATERLOCK A-221 binder | 0.106 |
| Polyvinylalcohol (M.W. 85000 to 146000) | 0.633 |
| Water | 11.17 |
| | 100.00 |

The wet zinc mass is molded into the near shape, though somewhat smaller size of the anode cavity. The molded wet zinc mass (wet preform) is then dried by heating in an oven at about 55° C. for a period of about 2 to 3 hours to evaporate water leaving a solid porous zinc mass (solid preform) having a porosity between about 40 to 50%. The solid porous zinc mass (solid preform) has the following composition:

| | Solid Porous Zinc Mass (Solid Preform) Wt. % |
|---|---|
| Zinc | 97.55 |
| Surfactant | |
| Dinonyl phenol phosphate ester surfactant (RM-510) | 0.119 |
| Binders | |
| CARBOPOL C940 binder | 1.43 |
| WATERLOCK A-221 binder | 0.119 |
| Polyvinylalcohol | 0.713 |
| | 100.00 |

After the solid porous zinc mass (solid preform) is inserted into the anode cavity an aqueous potassium hydroxide electrolyte comprising 38 wt % KOH and about 2 wt % ZnO was added in amount approximately about 0.7 part by weight aqueous electrolyte to 1 part by weight solid preform. The solid preform immediately absorbed the aqueous electrolyte and expanded to fill the anode cavity to form the final fresh anode. The final fresh anode did not have any discernible air pockets therein when the anode was viewed with the aid of X-ray photographs of the cell taken without magnification. The polyvinylalcohol within the final fresh anode helped to hold individual zinc particles in close proximity to one another within a tight network.

Fresh AA cells of Example 3 were discharged at a constant rate of 500 milliAmp.

At discharge of 500 milliAmp, the capacity obtained at a cut off voltage of 0.5 Volts was 1400 milliAmp-hrs. The average voltage at 50% capacity was 1.06 Volt. The energy output of the cell at 0.5V cutoff was 1470 milliWatt-hrs.

The test results are summarized in the following Tables:

TABLE 1

Performance Comparison Of AA Size Zinc/MnO2 Alkaline Cells, Discharged at 50 mAmp to Cut Off Voltage of 0.5 V

| | Capacity, mAmp-hrs. | Average Voltage to 50% Capacity | Energy Output, mWatt-Hrs. | Anode Gassing[1], ml. gas per gram anode |
|---|---|---|---|---|
| Comparative Cell (Anode Zinc Slurry, Example 1) | 3010 | 1.22 | 3520 | 0.0120 |
| Test Cell (Molded Zinc Anode, Example 2) | 2930 | 1.23 | 3450 | 0.0122 |
| Test Cell (Molded Zinc Anode, Example 3) | — | — | — | — |

Notes:
[1]The anode gassing was conducted by measuring the amount of gas generated from the zinc anode when the fresh zinc anode wasplaced in a sealed bag and stored at 60° C. for 4 weeks.

TABLE 2

Performance Comparison Of AA Size Zinc/MnO2 Alkaline Cells, Discharged at 500 mAmp to Cut Off Voltage of 0.5 V

| | Capacity, mAmp-hrs. | Average Voltage to 50% Capacity | Energy Output, mWatt-Hrs. | Anode Gassing[1], ml. gas per gram anode |
|---|---|---|---|---|
| Comparative Cell (Anode Zinc Slurry, Example 1) | 1550 | 1.06 | 1590 | 0.0120 |
| Test Cell (Molded Zinc Anode, Example 2) | 1530 | 1.07 | 1630 | 0.0122 |
| Test Cell (Molded Zinc Anode, Example 3) | 1400 | 1.06 | 1470 | — |

Notes:
[1]The anode gassing was conducted by measuring the amount of gas generated from the zinc anode when the fresh zincanode was placed in a sealed bag and stored at 60° C. for 4 weeks.

As shown from the data reported in the above tables, the overall performance of the AA zinc/MnO2 cells employing the molded zinc anode made by the process of the invention were generally comparable to the same cells employing conventional zinc anode slurry. Gassing tests of fresh molded zinc anode made by the method of invention were also comparable to zinc anode made by conventional anode slurry.

In another embodiment of the invention it has been determined that if a portion of the zinc particles forming the wet mold 815*b* are replaced with zinc fibers, a dried solid zinc mass 815*c* (solid preform) of enhanced structural integrity is produced. The solid zinc mass 815*c* (solid preform) having such enhanced structural integrity reduces the chance of breakage when it is necessary to insert it into irregular or narrow shaped anode cavities. Also the increased structural integrity of such dry preform 815*c* reduces the chance of breakage during handling and manufacture.

The zinc fibers may be blended with the remaining zinc particles during the preparation of the wet zinc paste 815*a* forming wet premold 815*b*. The addition of the zinc fibers are optional, but when added they desirably comprise between about 2 and 10 percent by weight (or even greater) of the total zinc. The remainder of the zinc can be zinc particles of any shape, for example spherical, acicular of irregular shape or any combination thereof. Such remaining zinc particles may have a mean average particle size desirably between about 30 and 1000 micron, desirably between about 30 and 400 micron, typically between about 100 and 400 micron. Such remaining zinc particles may be entirely non-spherical or a combination of spherical and non spherical particles. The zinc fibers, if added, are characterized by being elongated along one axis and short across the diameter. The fibers can be laid out on the top and bottom of the preform, or intermixed randomly with smaller sized spherical zinc particles within the anode formulation. The zinc fibers may desirably be added so that that they comprise between about 2 and 10 wt. %, e.g. 2, 5 or 10 wt % of the zinc content, and even more). Thus the zinc fibers may form part of or all of the zinc composition in the anode. The inclusion of zinc fibers has been found to strongly enhance the mechanical properties and resistance to breakage of the dry preform 815*c*, thus easing preform handling and improving the manufacturing process. The zinc fibers desirably comprise between about 2 and 10 weight percent, preferably between about 5 and 10 percent by weight of the total zinc.

The term "zinc fibers" as used herein shall mean elongated continuous strands of zinc having a length greater that 1 mm, desirably a length of at least 1.5 mm, preferably at least 2 mm. The length of the fibers are advantageously from 1.5 mm to 25 mm, desirably a length between about 2 mm and 25 mm, while the diameter is desirably from 0.01 mm to 0.5 mm. The zinc fibers are desirably between about 2 and 25 mm in length, preferably between about 5 mm and 20 mm length. The fibers may be elongated strands which may have cylindrical, elliptical, or non cylindrical, rectangular, or irregular shaped surfaces. Thus, the zinc fibers have an elongated surface and may appear as strands having a rounded smooth surface, but may also have an irregular shaped, jagged, or convoluted surface. The zinc fibers may have a diameter, thickness, or width desirably between about 0.05 mm and 0.5 mm. The width and thickness may be the same or different, and both width and thickness may desirably be in a range between about 0.05 mm and 0.5 mm.

The mechanical strength of dry solid premold 815*c* of same total zinc composition but with or without zinc fibers added was determined using an Instron mechanical tester (hereinafter the Instron Test). The test was conducted as follows: Two wooden dowels (2 mm diameter) were laid parallel to each other and spaced apart 6.5 mm (surface to surface) on a flat table. A rectangular slab of the dry premold sample 815*c* of a given width of 10 mm and thickness of 1.7 mm was then laid perpendicularly across the two parallel wooden dowels at about midpoint of the length of the dowels. A third wooden dowel (2 mm diameter) was placed on top of the dry premold sample 815*c* and half way between and parallel to the 2 wooden dowels underneath. (That is, the third dowel was oriented perpendicular to the sample.) A flat plunger was pressed vertically downward on the third dowel and underlying solid premold sample with the force applied to the region on the sample about midpoint between the first two parallel dowels. The force needed to break the sample (or cause it to significantly deform) was recorded.

When testing the dry solid premold 815*c* without zinc fibers, the sample broke abruptly when force was applied in the above described test using the Instron tester. By contrast when the dry solid preform samples (zinc fibers added so that they comprise between about 2 and 10 percent by weight (or more) of the total zinc) the samples did not break abruptly but rather began to bend and sag as force was applied gradually. As force was gradually increased a peak force was reached and which point the sample began to sag (deformation point) and the applied force decreased. The maximum applied force at which point the sample began to either break (break point in the solid premold samples 815*c* without zinc fibers) or began to sag (deformation point in the solid premold samples 815*c* with zinc fibers) was recorded and is reported in Tables 3 and 3A.

It was found that the load to fracture or deform the sample dry solid preforms 815*c* was significantly modified by the presence of fibers, with strength increasing typically at least between about 2 and 10 fold as zinc fibers were added to a level of between about 2 and 10 percent by weight of the total zinc. (When zinc fibers of 15 mm length and 60 micron diameter were added in amount comprising 10 percent by weight of the total zinc, the strength of the dry solid preform increased over 10 fold compared to the same sample without zinc fibers as reported in Example 5 and as shown in Table 3 and 3A.)

In addition, it was determined that placement of zinc fibers so that they tend to concentrate on the upper and lower flat surfaces of the dry solid preform had a further effect of increasing the strength of the dry solid preforms as compared to using a random mixture of zinc fibers uniformly mixed within the anode formulation. However, such specific placement of zinc fibers, for example, so they are closer to the surface of the solid preform 815*c*, increases the difficulty of fabrication and so represents a disadvantage from the manufacturing perspective. Thus, while it is possible to concentrate the zinc fibers more towards the dry preform surface the benefit of increased mechanical strength must be weighed against the increased cost of manufacture. Nevertheless, even when the zinc fibers (e.g. fibers of length between about 5.5 mm and 15 mm and 60 micron diameter) are added so they uniformly comprise between about 2 and 10 weight percent of the total zinc in the dry solid premold 815*c*, the mechanical integrity of the dry premold 815*c* (as determined by the above described Instron test) is increased at least between about 2 and 10 fold compared to the same sample having same total zinc concentration and same zinc particles, but without zinc fibers.

Specific examples demonstrating the beneficial properties and increased structural integrity of utilizing zinc fibers are described as follows:

EXAMPLE 4

Anode from Solid Porous Zinc Mass with 2 Wt. % of Total Zinc Comprising Zinc Fibers (15 mm Length×60 Micron Diameter)/Conventional $MnO_2$ Cathode AA size cells 810 were prepared as in Example 1 except that the anode 815 was formed from the wet zinc mass (wet preform) which was molded into the approximate shape of the anode cavity 813 and then dried to produce the solid porous zinc mass (solid preform) 815C of the invention. The anode 815 comprised about 2 wt. % zinc fibers based on the total amount of zinc. The zinc fibers had a length of 15 mm and diameter of 60 micron. The solid preform was inserted into the anode cavity 813 and then aqueous potassium hydroxide electrolyte (concentration between about 35 and 40 wt. % KOH and 2 wt. % ZnO) was added. The solid porous zinc mass (solid preform) immediately absorbed the alkaline electrolyte and expanded to form the final wet anode as described in the description hereinabove. The cathode composition comprising $MnO_2$ was the same as used in Example 1. The cell had 4.6 grams of zinc as in Example 1 and was balanced so that the theoretical capacity of the zinc divided by the theoretical capacity of the MnO2 was about 1. The composition of the wet and solid preforms are as follows:

| | Wet Preform, Wt. % |
|---|---|
| Zinc fibers (15 mm length) | 1.89 |
| Zinc (100-400 micron average) | 92.76 |
| Surfactant | |
| Dinonyl phenol phosphate ester surfactant (RM-510) | 0.108 |
| Binders | |
| CARBOPOL C940 binder | 1.04 |
| WATERLOCK A-221 binder | 0.108 |
| Polyvinylalcohol (M.W. 85000 to 146000) | 0.324 |
| Water | 3.776 |
| | 100.00 |

The wet zinc mass is molded into the near shape, though somewhat smaller size of the anode cavity. The molded wet zinc mass (wet preform) is then dried by heating in an oven at about 55° C. for a period of about 2 to 3 hours to evaporate water leaving a solid porous zinc mass (solid preform) having a porosity between about 40 to 50%. The solid porous zinc mass (solid preform) has the following composition:

| | Solid Porous Zinc Mass (Solid Preform) Wt. % |
|---|---|
| Zinc fibers (15 mm length) | 1.97 |
| Zinc (100-400 micron average) | 96.39 |
| Surfactant | |
| Dinonyl phenol phosphate ester surfactant (RM-510) | 0.112 |
| Binders | |
| CARBOPOL C940 binder | 1.08 |
| WATERLOCK A-221 binder | 0.112 |
| Polyvinylalcohol | 0.336 |
| | 100.00 |

The physical structural integrity of the solid porous zinc mass (solid preform) having the above composition with about 2 wt. % of the total zinc comprising zinc fibers was tested. (About 2 wt. % of the total zinc in the above solid preform comprised zinc fibers (15 mm length×60 micron diameter) with the remaining zinc in the form of conventional particles (100-400 micron mean average size) as above indicated. The physical structural integrity of the solid preform with zinc fibers was at least about 3 times higher, as measured by the above described Instron test, than the same solid preform of same composition and total weight percent, but which did not contain any zinc fibers. (That is, the comparative solid preform had the same composition and was made in the same manner as in the above Example 4 solid preform but did not contain any zinc fibers.) Specifically the break point of the above solid preform sample with 2 percent by weight of the total zinc comprising zinc fibers (15 mm length×60 micron diameter) was measured with the Instron tester as about 1.4 pounds force. This compared to a break point of 0.4 pounds force for the comparative solid preform of same total zinc concentration and same zinc particles, but without zinc fibers.

EXAMPLE 5

Anode from Solid Porous Zinc Mass with 10 Wt. % of Total Zinc Comprising Zinc Fibers (15 mm Length×60 Micron Diameter)/Conventional MnO2 Cathode Test AA size cells 810 were prepared as in Example 1 except that the anode 815 was formed from the wet zinc mass (wet preform) which was molded into the approximate shape of the anode cavity 813 and then dried to produce the solid porous zinc mass (solid preform) 815C of the invention. The anode 815 comprised about 10 wt. % zinc fibers based on the total amount of zinc. The zinc fibers had a length of 15 mm and diameter of 60 micron. The solid preform was inserted into the anode cavity 813 and then aqueous potassium hydroxide electrolyte (concentration between about 35 and 40 wt. % KOH and 2 wt. % ZnO) was added. The solid porous zinc mass (solid preform) immediately absorbed the alkaline electrolyte and expanded to form the final wet anode as described in the description hereinabove. The cathode composition comprising $MnO_2$ was the same as used in Example 1. The cell had 4.6 grams of zinc as in Example 1 and was balanced so that the theoretical capacity of the zinc divided by the theoretical capacity of the MnO2 was about 1. The composition of the wet and solid preforms are as follows:

| | Wet Preform, Wt. % |
|---|---|
| Zinc fibers (15 mm length) | 9.46 |
| Zinc (100-400 micron average) | 85.19 |
| Surfactant | |
| Dinonyl phenol phosphate ester surfactant (RM-510) | 0.108 |
| Binders | |
| CARBOPOL C940 binder | 1.04 |
| WATERLOCK A-221 binder | 0.108 |
| Polyvinylalcohol (M.W. 85000 to 146000) | 0.324 |
| Water | 3.776 |
| | 100.00 |

The wet zinc mass is molded into the near shape, though somewhat smaller size of the anode cavity. The molded wet zinc mass (wet preform) is then dried by heating in an oven at about 55° C. for a period of about 2 to 3 hours to evaporate water leaving a solid porous zinc mass (solid preform) having a porosity between about 40 to 50%. The solid porous zinc mass (solid preform) has the following composition:

| | Solid Porous Zinc Mass (Solid Preform) Wt. % |
|---|---|
| Zinc fibers (15 mm length) | 9.84 |
| Zinc particles (100-400 micron average) | 88.52 |
| Surfactant | |
| Dinonyl phenol phosphate ester surfactant (RM-510) | 0.112 |
| Binders | |
| CARBOPOL C940 binder | 1.08 |
| WATERLOCK A-221 binder | 0.112 |
| Polyvinylalcohol | 0.336 |
| | 100.00 |

The physical structural integrity of the solid porous zinc mass (solid preform) having the above composition with about 10 wt. % of the total zinc comprising zinc fibers was tested. (About 10 Wt. % of the total zinc in the above solid preform comprised zinc fibers (15 mm length×60 micron diameter) with the remaining zinc in the form of conventional particles (100-400 micron mean average size) as above indicated. The physical structural integrity of the solid preform with zinc fibers was at least about 10 times higher as measured by the above described Instron test than the same solid preform of same composition and total weight percent zinc, but which did not contain any zinc fibers. (That is, the comparative solid preform had the same composition and was made in the same manner as in the above Example 5 solid preform but did not contain any zinc fibers.) Specifically the break or deformation point of the above solid preform sample with 10 percent by weight of the total zinc comprising zinc fibers (15 mm length×60 micron diameter) was measured by the above described Instron test as about 6.1 pounds force. This compared to a break point of 0.4 pounds force for the comparative solid preform of same total zinc concentration and same zinc particles, but without zinc fibers.

The 10 fold increase in physically structural integrity of the Example 5 test solid preform was obtained at the expense of a loss of less than 5 percent in capacity (mAmp-hrs) and less than 5 percent in energy output (mWatt-hrs) of test AA cells with zinc fibers compared to the comparative cells of same anode and cathode composition, but without zinc fibers.

Specifically fresh AA cells of Example 5 were discharged at a constant rate of 1.0 Amp to a cut off voltage of 0.5 volts. In separate tests batches of like fresh AA cells were discharged at a constant rate of 50 milliAmp to a cut off voltage of 0.5 volts. Fresh AA cells of same anode and cathode composition were constructed (Comparative Example 5 cells) except that the anode did not contain any zinc fibers. However, the total zinc wt. % in the Example 5 Comparative was the same as in Example 5 test cells and the anode was made in same manner from the solid preform. The capacity (mAmp-hrs) and energy output (mWatt-hrs) of the AA test cells with zinc fibers was less than about 5 percent lower than the comparative AA cells of same anode and cathode composition but without zinc fibers. The actual performance values are summarized in the following Tables 3 and 3A.

TABLE 3

Performance Comparison Of AA Size Zinc/MnO2 Alkaline Cells (Example 5 composition) Discharged at 1.0 Amp to Cut Off Voltage of 0.5 V (values are average of 4 cells)

| | Capacity, mAmp-hrs. | Average Voltage at 50% Capacity | Energy Output, mWatt-Hrs. | Structural Integrity (Break or Deformation Point)—Intstron Test, pounds |
|---|---|---|---|---|
| Comparative Cell (Molded Zinc Anode without Zn fibers, Example 5) | 735 | 0.99 | 742 | 0.4 |
| Test Cell (Molded Zinc Anode with Zn fibers, Example 5) | 711 | 1.02 | 718 | 6.1 |

TABLE 3A

Performance Comparison Of AA Size Zinc/MnO2 Alkaline Cells (Example 5 composition) Discharged at 50 mAmp to Cut Off Voltage of 0.5 V (values are average of 4 cells)

| | Capacity, mAmp-hrs. | Average Voltage at 50% Capacity | Energy Output, mWatt-Hrs. | Structural Integrity (Break or Deformation Point)—Intstron Test, pounds |
|---|---|---|---|---|
| Comparative Cell (Molded Zinc Anode without Zn fibers, Example 5) | 2158 | 1.24 | 2653 | 0.4 |
| Test Cell (Molded Zinc Anode with Zn fibers, Example 5) | 2097 | 1.24 | 2584 | 6.1 |

EXAMPLE 6

Anode from Solid Porous Zinc Mass with 2 Wt. % of Total Zinc Comprising Zinc Fibers (7.5 mm Length×60 Micron Diameter)/Conventional MnO2 Cathode AA size cells 810 were prepared as in Example 1 except that the anode 815 was formed from the wet zinc mass (wet preform) which was molded into the approximate shape of the anode cavity 813 and then dried to produce the solid porous zinc mass (solid preform) 815C of the invention. The anode 815 comprised about 2 wt. % zinc fibers based on the total amount of zinc. The zinc fibers had a length of 7.5 mm and diameter of 60 micron. The solid preform was inserted into the anode cavity 813 and then aqueous potassium hydroxide electrolyte (concentration between about 35 and 40 wt. % KOH and 2 wt. % ZnO) was added. The solid porous zinc mass (solid preform) immediately absorbed the alkaline electrolyte and expanded to form the final wet anode as described in the description hereinabove. The cathode composition comprising $MnO_2$ was the same as used in Example 1. The cell had 4.6 grams of zinc as in Example 1 and was balanced so that the theoretical capacity of the zinc divided by the theoretical capacity of the MnO2 was about 1. The compositions of the wet and solid preforms are as follows:

| | Wet Preform, Wt. % |
|---|---|
| Zinc fibers (7.5 mm length) | 1.89 |
| Zinc (100-400 micron average) | 92.76 |
| Surfactant | |
| Dinonyl phenol phosphate ester surfactant (RM-510) | 0.108 |
| Binders | |
| CARBOPOL C940 binder | 1.04 |
| WATERLOCK A-221 binder | 0.108 |
| Polyvinylalcohol (M.W. 85000 to 146000) | 0.324 |
| Water | 3.776 |
| | 100.00 |

The wet zinc mass is molded into the near shape, though somewhat smaller size of the anode cavity. The molded wet zinc mass (wet preform) is then dried by heating in an oven at about 55° C. for a period of about 2 to 3 hours to evaporate water leaving a solid porous zinc mass (solid preform) having a porosity between about 40 to 50%. The solid porous zinc mass (solid preform) has the following composition:

| | Solid Porous Zinc Mass (Solid Preform) Wt. % |
|---|---|
| Zinc fibers (7.5 mm length) | 1.97 |
| Zinc (100-400 micron average) | 96.39 |
| Surfactant | |
| Dinonyl phenol phosphate ester surfactant (RM-510) | 0.112 |
| Binders | |
| CAKBOPOL C940 binder | 1.08 |
| WATERLOCK A-221 binder | 0.112 |
| Polyvinylalcohol | 0.336 |
| | 100.00 |

The physical structural integrity of the solid porous zinc mass (solid preform) having the above composition with about 2 wt. % of the total zinc comprising zinc fibers was tested. (About 2 wt. % of the total zinc in the above solid preform comprised zinc fibers (7.5 mm length×60 micron diameter) with the remaining zinc in the form of conventional particles (100-400 micron mean average size) as above indicated. The physical structural integrity of the solid preform with zinc fibers was at least about 2 times higher as measured by the above described load deformation test than the same solid preform of same composition and total weight percent, but which did not contain any zinc fibers. (That is, the comparative solid preform had the same composition and was made in the same manner as in the above Example 6 solid preform but did not contain any zinc fibers.) Specifically, the break or deformation point of the above solid preform sample with 2 percent by weight of the total zinc comprising zinc fibers (7.5 mm length×60 micron diameter) as measured by the above described Instron test was about 0.9 pounds force. This compared to a break point of 0.4 pounds force for the comparative solid preform of same total zinc concentration and same zinc particles, but without zinc fibers.

Although the invention has been described with respect to specific embodiments, it will be appreciated that variations are possible within the concept of the invention. Thus, the invention is not intended to be limited to the specific embodiments herein described, but is within the claims and equivalents thereof.

What is claimed is:

1. A method of forming an anode for an alkaline cell comprising the steps of:

a) forming a mixture comprising zinc particles, a binder comprising polyvinylalcohol, and water, wherein at least a portion of said zinc particles comprises zinc fibers;

b) drying the mixture to evaporate at least a portion of the water therein and thereby producing a dimensionally stabilized mass comprising said zinc particles and said zinc fibers;

c) inserting said dimensionally stabilized mass into an anode cavity within an alkaline cell; and d) adding a fluid comprising aqueous alkaline electrolyte to the anode cavity whereby said fluid is absorbed by said mass and thereby forms said anode.

2. The method of claim 1 wherein said dimensionally stabilized mass is a solid porous mass comprising said zinc particles and said zinc fibers.

3. The method of claim 2 wherein said solid porous mass expands as said fluid is absorbed therein in step (d).

4. The method of claim 2 wherein said solid porous mass is storable in ambient air.

5. The method of claim 1 wherein said zinc fibers comprise continuous strands of zinc having a length of at least 1.5 mm.

6. The method of claim 1 wherein said zinc fibers comprise continuous strands of zinc having a length of at least 2 mm.

7. The method of claim 1 wherein said zinc fibers comprise continuous strands of zinc having a length of between about 2 mm and 25 mm.

8. The method of claim 1 wherein said zinc fibers comprise between about 2 and 10 percent by weight of the total zinc in said zinc particles including said zinc fibers.

9. The method of claim 1 wherein said mixture is at least substantially wrapped with a separator material prior to drying said mixture.

10. The method of claim 1 wherein said mixture is molded into a designated shape prior to drying said mixture.

11. The method of claim 1 wherein the aqueous alkaline electrolyte comprises potassium hydroxide.

12. The method of claim 1 wherein said drying in step b) is effected by heating said mixture.

13. The method of claim 1 wherein the polyvinylalcohol has a molecular weight between about 85000 and 146000.

14. The method of claim 1 wherein said binder further comprises a gelling agent.

15. The method of claim 1 wherein said binder further comprises a crosslinked acrylic acid polymer gelling agent.

16. The method of claim 1 wherein said binder further comprises a gelling agent comprising a starch graft copolymer of polyacrylic acid and polyacrylamide.

17. The method of claim 1 wherein said binder further comprises a crosslinked acrylic acid polymer.

18. The method of claim 1 wherein said binder further comprises a mixture of a crosslinked acrylic acid polymer and a starch graft copolymer.

19. The method of claim 1 wherein said mixture prior to drying further comprises indium in total amount between about 200 and 1000 ppm of the zinc.

20. The method of claim 1 wherein said mixture prior to drying further comprises a surfactant.

21. The method of claim 20 wherein said surfactant comprises an organic phosphate ester.

22. The method of claim 1 wherein said mixture is molded into the approximate shape of said anode cavity prior to drying said mixture.

* * * * *